(12) United States Patent
Lee

(10) Patent No.: US 6,571,901 B2
(45) Date of Patent: Jun. 3, 2003

(54) HOOD RAISING MECHANISM OF MOTOR VEHICLE

(75) Inventor: Dong-Jea Lee, Kwangmyong-shi (KR)

(73) Assignee: KIA Motor Corporation, Seoul (KR)

( * ) Notice: Subject to any disclaimer, the term of this patent is extended or adjusted under 35 U.S.C. 154(b) by 0 days.

(21) Appl. No.: 09/917,816

(22) Filed: Jul. 31, 2001

(65) Prior Publication Data

US 2002/0043418 A1 Apr. 18, 2002

(30) Foreign Application Priority Data

Oct. 18, 2000 (KR) .......................... 2000-61294

(51) Int. Cl.[7] .................... B60R 21/34; B62D 25/10; B62D 25/12
(52) U.S. Cl. ..................... 180/274; 180/69.21
(58) Field of Search .............. 180/69.21, 274, 180/281; 296/194, 189

(56) References Cited

U.S. PATENT DOCUMENTS 6,293,362 B1 * 9/2001 Sasaki et al. ............ 180/274
6,364,402 B1 * 4/2002 Sasaki ..................... 296/194

FOREIGN PATENT DOCUMENTS

| DE | 20105884 U1 | * | 3/2001 |
| DE | 199 48 881 A1 | * | 4/2001 |
| EP | 926018 A1 | * | 6/1999 |
| EP | 1 090 819 A1 | * | 4/2001 |
| JP | 404212677 A | * | 8/1992 |

* cited by examiner

Primary Examiner—Paul N. Dickson
Assistant Examiner—Ruth Ilan
(74) Attorney, Agent, or Firm—Birch, Stewart, Kolasch & Birch, LLP

(57) ABSTRACT

Disclosed is a hood raising mechanism of a motor vehicle. The hood raising mechanism comprises a sensor installed at a front part of a vehicle body for sensing hitting of the motor vehicle against an obstacle; a plunger member received in a receiving portion which is formed in a fender of the vehicle body, in a manner such that the plunger member can be moved upward to raise a rear end of the hood, the plunger member being defined at a lengthwise middle portion thereof with an engaging groove; a compression spring for elastically biasing upward the plunger member; a locking pin capable of being moved in such a way as to be engaged into or disengaged from the engaging groove defined in the plunger member; and an actuator for moving the locking pin in response to a signal inputted from the sensor, so that the locking pin is disengaged from the engaging groove to allow the plunger member to be moved upward.

1 Claim, 4 Drawing Sheets

HOOD RAISING MECHANISM OF MOTOR VEHICLE

BACKGROUND OF THE INVENTION

1. Field of the Invention

The present invention relates to a hood of a motor vehicle, and more particularly, the present invention relates to a hood raising mechanism of a motor vehicle, which can raise a hood when the vehicle hits a pedestrian so that impact applied to the head of the pedestrian is mitigated.

2. Description of the Related Art

Generally, in an engine room which is defined at a front part of a motor vehicle, there are disposed an engine, a cooling system, and a variety of devices which are needed for driving the vehicle. As shown in FIG. 1, a hood closes the engine room such that these arrangements are not exposed to the outside.

Referring to FIG. 2, there is illustrated an assembling structure of a hood to a vehicle body. The hood 100 has a hood outer panel 103 and a hood inner panel 104 which are overlapped with each other. The hood 100 is assembled to the vehicle body 110 in a manner such that it can be pivoted about a hinge section adjacent to a rear end of an engine room.

The hinge section for pivotably assembling the hood 100 to the body 110 includes a hood-side bracket 105 which is fastened to a lower surface of the hood 100 and a body-side bracket 106 which is fastened to an upper surface of the body 110. Due to the fact that the hood-side bracket 105 and the body-side bracket 106 are hingedly connected with each other by a hinge pin 101, the hood 100 is pivotably fastened with respect to the body 110.

Normally, the hood 100 is held at a closed position where it closes the engine room. When it is necessary to conduct maintenance and repair works for arrangements disposed in the engine room, by upward pivoting movement of the hinge section about the hinge pin 101, the engine room is opened. On the other hand, while not shown in the drawings, a hood latch mechanism is installed on a front end of the hood 100. The hood latch mechanism functions to lock the hood 100 so that the hood 100 is not spontaneously opened while being at the closed position.

On the other hand, the drawing reference numeral 102 represents a shotgun which projects upward out of the upper surface of the vehicle body 110. The shotgun 102 functions to prevent, to some extent, the body 110 from being crushed when the vehicle hits an obstacle, by partially absorbing a load applied to the body 110. Also, the shotgun 102 functions to guide rainwater to the outside of the body 110 when it rains. Due to this, the shotgun 102 is also called a rain rail.

When the vehicle hits a pedestrian, the pedestrian is thrown toward the engine room, and by this, the head of the pedestrian is bumped against the hood 100 which covers the engine room. In the case of an adult, the head is mainly bumped against a region A of FIG. 1, and in the case of a child, the head is mainly bumped against a region B of FIG. 1. If the head of the pedestrian is bumped against the hood 100, the hood 100 is deformed downward, and the head of the pedestrian is secondarily bumped against arrangements such as en engine, which are positioned below the hood 100, by the medium of the hood 100. In the case that the head of the pedestrian is simply bumped against the hood 100, an injury rate of the pedestrian's head is decreased, when compared to the case that the head of the pedestrian is bumped by the medium of the hood 100 against the arrangements which are positioned below the hood 100. Consequently, when the vehicle hits the pedestrian, even though the head of the pedestrian is bumped against the hood 100, it is necessary to prevent the head of the pedestrian from being further bumped, through the hood 100, against the arrangements positioned below the hood 100.

To this end, a predetermined separation should be maintained between the hood 100 and the arrangements which are disposed in the engine room. For example, it is prescribed in the U.S. law for protection of an pedestrian that a distance of no less than 50 mm in the case of a child (corresponding to the region B of FIG. 1) or 70 mm in the case of an adult (corresponding to the region A of FIG. 1) is secured between the hood and the arrangements which are positioned below the hood.

Since the conventional hood constructed as mentioned above only has a separation of about 40 mm between the vehicle body and the hinge pin, in order to increase a separation between the hood and the arrangements in the engine room, it is necessary to increase a height of the hood or modify structures of a fender and a cowl of the vehicle body, which delimit the engine room. In this case, because the hood comes off the fender, forward and downward visibility of a driver is deteriorated and aesthetic appeal of the vehicle body is reduced.

SUMMARY OF THE INVENTION

Accordingly, the present invention has been made in an effort to solve the problems occurring in the related art, and an object of the present invention is to maintain a sufficient separation between a hood and arrangements in an engine room so that an injury rate of a pedestrian's head is minimized when a vehicle hits the pedestrian, while not deteriorating forward and downward visibility of a driver and reducing aesthetic appeal of a vehicle body.

In order to achieve the above object, according to the present invention, there is provided a hood raising mechanism of a motor vehicle, comprising: a sensor installed at a front part of a vehicle body for sensing hitting of the motor vehicle against an obstacle; a plunger member received in a receiving portion which is formed in a fender of the vehicle body, in a manner such that the plunger member can be moved upward to raise a rear end of the hood, the plunger member being defined at a lengthwise middle portion thereof with an engaging groove; a compression spring for elastically biasing upward the plunger member; a locking pin capable of being moved in such a way as to be engaged into or disengaged from the engaging groove defined in the plunger member; and an actuator for moving the locking pin in response to a signal inputted from the sensor, so that the locking pin is disengaged from the engaging groove to allow the plunger member to be moved upward.

Preferably, the locking pin may be formed on a circumferential outer surface thereof with a first gear; and the actuator may have a second gear which is meshed with the first gear of the locking pin and a motor for driving the second gear.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
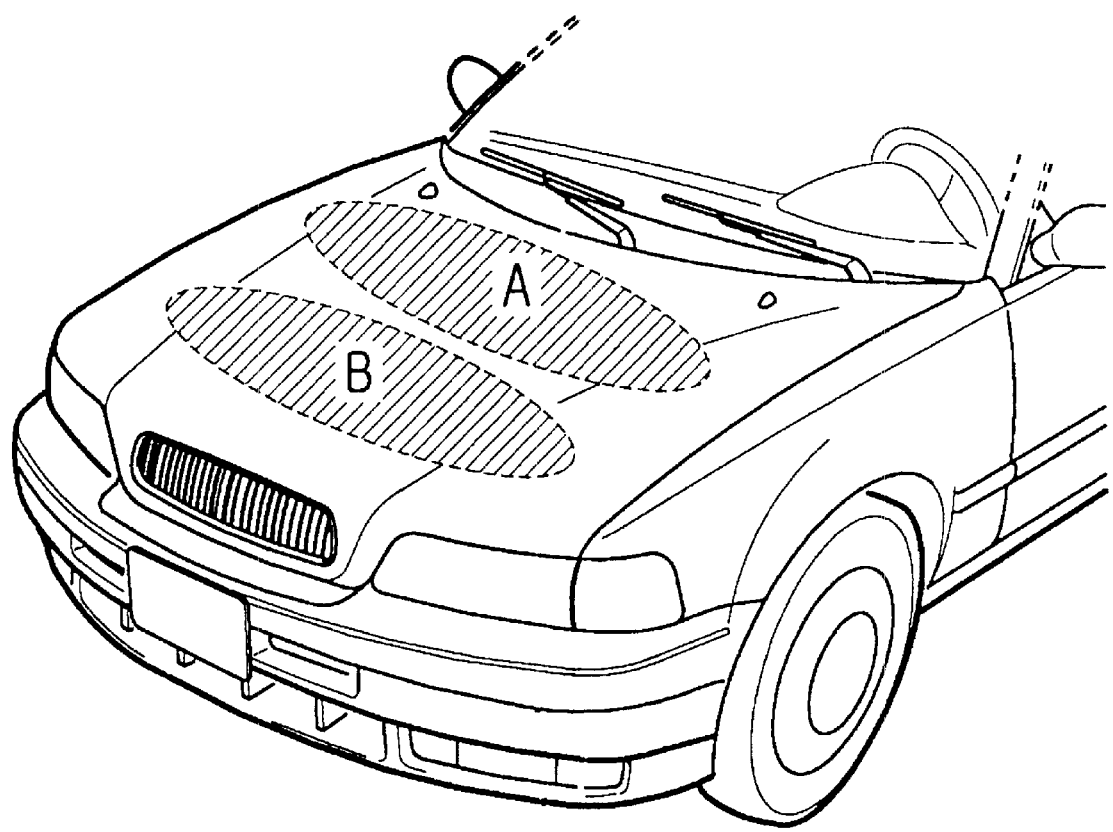
FIG. 1 is a perspective view illustrating a conventional hood of a motor vehicle.
Figure 2:
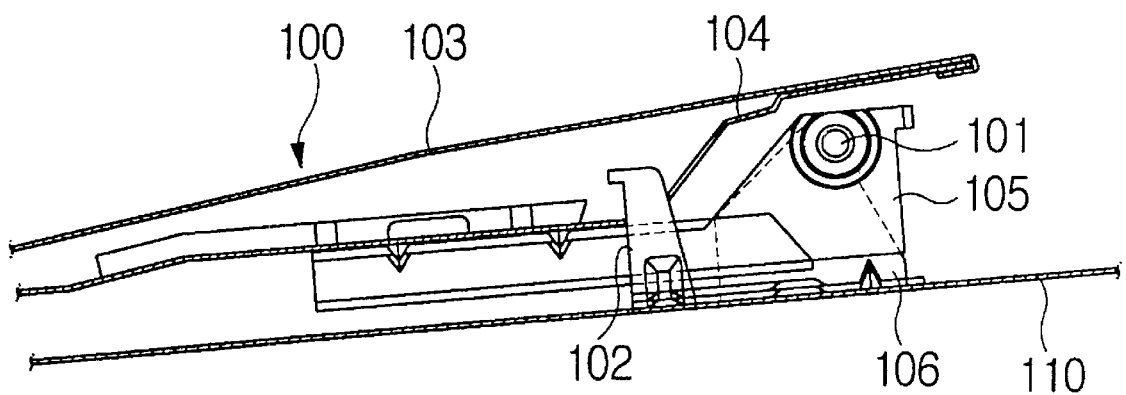
FIG. 2 is a cross-sectional view schematically illustrating a construction of a hinge section of the hood shown in FIG. 1.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
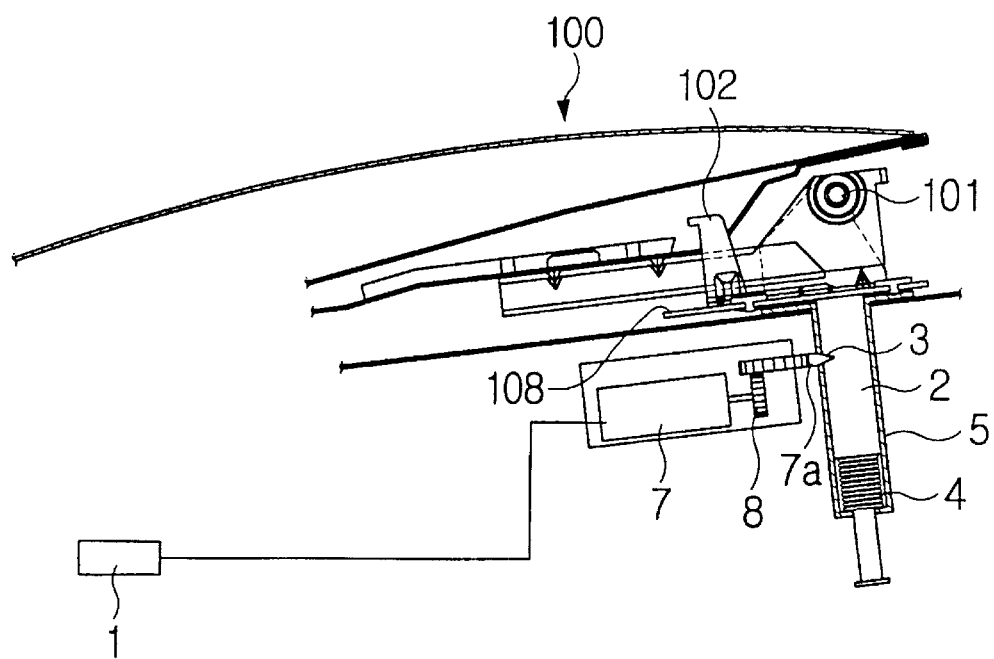
FIG. 3 is a cross-sectional view illustrating a hood raising mechanism of a motor vehicle, in accordance with an embodiment of the present invention.
Figure 4:
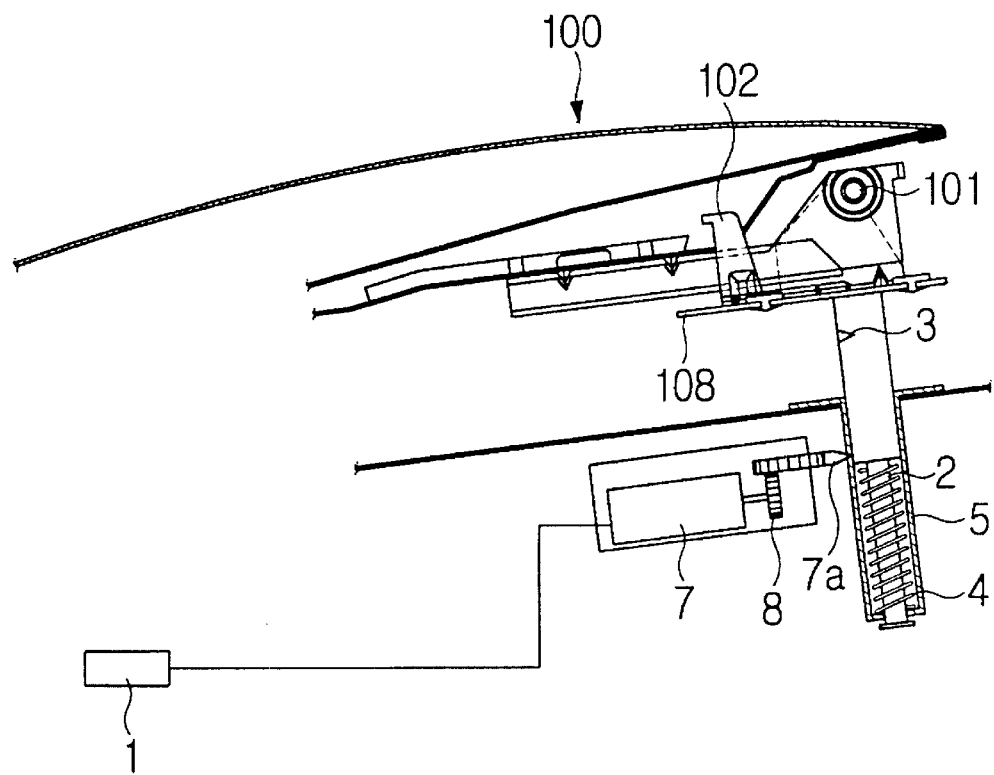
FIG. 4 is a cross-sectional view illustrating a state wherein a hood is raised by operation of the hood raising mechanism according to the present invention.

Referring to FIG. 3, there is shown a cross-sectional view illustrating a hood raising mechanism of a motor vehicle, in accordance with an embodiment of the present invention. As can be readily seen from FIG. 3, the hood raising mechanism according to the present invention includes an impact sensor 1, a plunger member 2, a compression spring 4, a locking pin 7a and a motor 7.

The impact sensor 1 is installed at a front part of a vehicle body and functions to sense hitting of the front part of the vehicle body against an obstacle. The impact sensor 1 is almost the same as an air bag sensor, and the air bag sensor can be employed as it is to also perform a function of the impact sensor 1.

The plunger member 2 is received in a receiving portion 5 which is formed in a fender of the vehicle body, in a manner such that the plunger member 2 can be moved upward and downward. An upper end of the plunger member 2 is connected to a lower end of a shotgun 102. More concretely speaking, a hinge section of a hood 100 is mounted to a base panel 108 along with the shotgun 102, and the base panel 108 is connected to the upper end of the plunger member 2.

The compression spring 4 is brought into contact with a lower end of the plunger member 2 so as to elastically bias upward the plunger member 2.

According to this, if the plunger member 2 is maximally moved upward by virtue of elasticity of the compression spring 4, the hood 100 is raised so that it is separated from arrangements positioned in an engine room by a distance of no less than 70 mm in the case of the region A of FIG. 1 and 50 mm in the case of the region B of FIG. 1.

Further, the plunger member 2 is defined at a lengthwise middle portion thereof with an engaging groove 3. The locking pin 7a is disengagably engaged into the engaging groove 3. The locking pin 7a can be moved in a direction orthogonal to a moving direction of the plunger member 2 in a manner such that the locking pin 7a passes through a hole defined in the receiving portion 5 and is engaged into the engaging groove 3 defined in the plunger member 2. A first gear is formed on a circumferential outer surface of the locking pin 7a.

A second gear 8 which is meshed with the first gear formed on the locking pin 7a, is secured to an output shaft of the motor 7. If the second gear 8 is rotated by driving of the motor 7, the locking pin 7a is moved forward and backward in a horizontal direction. In the preferred embodiment of the present invention, the first gear and the second gear 8 can comprise a rack and a pinion, respectively. The motor 7 is electrically connected with the impact sensor 1 and is operated by a signal inputted from the impact sensor 1.

Normally, the locking pin 7a is engaged into the engaging groove 3 which is defined in the plunger member 2. According to this, the plunger member 2 is maintained in a state wherein it is moved downward to compress the compression spring 4. In this state, if the motor vehicle hits a pedestrian while traveling on a road, impact is sensed by the sensor 1 which is installed on the front part of the vehicle body. An impact sensing signal which is generated by the sensor 1, is inputted into the motor 7, and the motor 7 is driven in response to the impact sensing signal. Hence, the second gear 8 which is secured to the output shaft of the motor 7, is rotated. By rotation of the second gear 8, the locking pin 7a having the first gear which is meshed with the second gear 8, is withdrawn in such a way as to be disengaged from the engaging groove 3 of the plunger member 2. If the locking pin 7a is disengaged from the engaging groove 3 of the plunger member 2, the plunger member 2 is moved upward by elasticity of the compression spring 4.

As the plunger member 2 is moved upward, the shotgun 102 to which the upper end of the plunger member 2 is secured, that is, the base panel 108 is also moved upward. At this time, since a rear portion of the hood 100 is supported by the shotgun 102, it is moved upward as well. As a result of this, as the hood 100 is raised so that the hood 100 and the arrangements disposed in the engine room are separated from each other, even when the head of the pedestrian is bumped against the hood 100, shock which is applied to the head of the pedestrian, is significantly reduced.

As a consequence, the hood raising mechanism of a motor vehicle according to the present invention provides advantages in that, since a hood of the present invention can be normally positioned at the same height in comparison with the conventional hood, a vehicle can have a diversity of designs, and forward and downward visibility of a driver can be secured in a sufficient manner. Also, when the vehicle hits a pedestrian, the hood is raised upward so as to maintain a sufficient separation between the hood and arrangements in an engine room so that an injury rate of a pedestrian's head is minimized.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A hood raising mechanism of a motor vehicle, comprising:

a sensor installed at a front part of a vehicle body for sensing hitting of the motor vehicle against an obstacle;

a plunger member received in a receiving portion which is formed in a fender of the vehicle body, in a manner such that the plunger member can be moved upward to raise a rear end of the hood, the plunger member being defined at a lengthwise middle portion thereof with an engaging groove;

a compression spring for elastically biasing upward the plunger member;

a locking pin capable of being moved in such a way as to be engaged into or disengaged from the engaging groove defined in the plunger member, the locking pin being formed on a circumferential outer surface thereof with a first gear; and an actuator for moving the locking pin in response to a signal inputted from the sensor, so that the locking pin is disengaged from the engaging groove to allow the plunger member to be moved upward, the actuator having a second gear which is meshed with the first gear of the locking pin and a motor for driving the second gear.

* * * * *